United States Patent [19]

Mikami

[11] Patent Number: 4,544,042
[45] Date of Patent: Oct. 1, 1985

[54] HOPPER DOOR ACTUATING APPARATUS FOR AN AUTOMATIC WEIGHING APPARATUS

[75] Inventor: Yoshiharu Mikami, Kyoto, Japan
[73] Assignee: Kabushiki Kaisha Ishida Koki Seisakusho, Kyoto, Japan
[21] Appl. No.: 601,930
[22] Filed: Apr. 19, 1984

Related U.S. Application Data

[63] Continuation-in-part of Ser. No. 549,762, Nov. 8, 1983.
[51] Int. Cl.[4] ............ G01G 19/22; G01G 13/16; G01G 13/34
[52] U.S. Cl. ........................... 177/25; 177/108; 177/112
[58] Field of Search ........... 177/25, 105, 108, 112, 177/113, DIG. 12

[56] References Cited

U.S. PATENT DOCUMENTS

| | | | |
|---|---|---|---|
| 3,112,000 | 11/1963 | Morris et al. | 177/108 X |
| 3,783,957 | 1/1974 | Borghi | 177/105 X |
| 4,193,465 | 3/1980 | Henry | 177/108 |
| 4,454,924 | 6/1984 | Minamida | 177/25 |

Primary Examiner—E. A. Goldberg
Assistant Examiner—Patrick W. Foster
Attorney, Agent, or Firm—Staas & Halsey

[57] ABSTRACT

A unit for supplying articles to be weighed is supported on a supporting platform above the central portion of an automatic weighing apparatus, a plurality of weighing machines are arranged on the outer periphery of the supporting platform, and a plurality of circularly arranged hoppers are provided, each hopper corresponding to one of the weighing machines. A plurality of radially extending hopper gate opening devices are attached to the bottom side of the supporting platform inwardly of the hoppers, each hopper gate opening device corresponding to and opposing one of the hoppers. The hopper gate opening device is adapted to be detached from the weighing apparatus by pulling it outwardly of the apparatus, and reattached to the apparatus from the outside thereof.

6 Claims, 9 Drawing Figures

HOPPER DOOR ACTUATING APPARATUS FOR AN AUTOMATIC WEIGHING APPARATUS

This is a continuation-in-part of application Ser. No. 549,762, filed Nov. 8, 1983.

BACKGROUND OF THE INVENTION

This invention relates to an automatic weighing apparatus and, more particularly, to the arrangement of devices for opening the gates of hoppers in an automatic weighing apparatus.

A known automatic weighing apparatus of the combinatorial weighing type has a plurality of weighing machines disposed on a circle surrounding a unit which supplies articles to be weighed, and operates by supplying weighing hoppers, which are associated with respective ones of the weighing machines, with the articles from the supply unit, combining the weight values provided by the weighing machines into a number of different combinations and finding the total weight value of each combination, selecting a so-called "optimum combination" of weighing machines to obtain a predetermined weight from among the total weight values of the combinations, discharging only the articles contained in the weighing hoppers of the selected weighing machines, and collecting the discharged articles to provide a batch of the articles having the predetermined weight. In order for the weighing hoppers of the selected weighing machines to discharge their articles and be resupplied with articles from overlying pool hoppers to prepare for the next weighing cycle, the automatic weighing apparatus is provided with devices for opening the gates of the designated weighing and pool hoppers each weighing cycle.

In the conventional automatic weighing apparatus of the above-described type, the hopper gate opening devices are arrayed in a circular configuration about the hoppers, and they are themselves large in size even if arranged inside the hoppers, thereby increasing the overall size of the apparatus and, hence, requiring a large amount of space for installation. In addition, the weighing hoppers and pool hoppers must be detached from the weighing apparatus for periodic cleaning or whenever cleaning is required. However, since the hopper gate opening devices are situated on the outer periphery of the weighing apparatus, detaching and then reattaching the hoppers is an extremely troublesome operation.

My copending application, Ser. No. 659,762 discloses a hopper gate opening device including a drive mechanism in which a follower roller which follows the cam surface of a cam is connected to a push rod. The push rod is biased in the direction of the cam by a return spring so that the follower roller is abutted against the cam surface owing to the biasing force. The push rod is reciprocated by rotation of the cam to open and close the gate of the corresponding hopper. In the drive mechanism of the type described, the cam is rotated at high speed in order to perform a rapid weighing operation. When the cam is rotated at high speed, however, the biasing force of the return spring alone is insufficient to provide a reliable follow-up capability, and the follower member tends to part from the cam surface. This is a source of erroneous operation and results in considerable noise and vibration.

SUMMARY OF THE INVENTION

An object of the present invention is to provide an automatic weighing apparatus in which the devices for opening the hopper gates are compact, the weighing apparatus which includes these devices being reduced in size.

Another object of the present invention is to provide an automatic weighing apparatus in which weighing hoppers and pool hoppers can be attached and detached with ease.

According to the present invention, the foregoing objects are attained by providing an automatic weighing apparatus having a plurality of weighing machines arranged on a circle on the outer periphery of a unit which supplies articles to be weighed, and a plurality of hoppers, each corresponding to one of the weighing machines. A plurality of radially extending hopper gate opening devices are attached to the bottom side of a supporting platform of the article supply unit inwardly of the hoppers, each hopper gate opening device corresponding to and opposing one of the hoppers. Each hopper gate opening device includes drive mechanisms equal in number to the hopper gates, the drive mechanisms being operatively associated with a single drive shaft.

Further, according to the invention, provided in each drive mechanism is a cam which, when rotated, thrusts a push rod forward to open a hopper gate. The cam has a guide portion provided at a position where the cam lift is zero, the guide portion serving to forcibly restore a follower roller mounted on the push rod. Accordingly, the push rod is restored smoothly and reliably via the follower roller. This makes it possible to prevent a phenomenon wherein the follower roller separates from the cam while the push rod is retracted, as well as premature cessation of push rod motion and violent closures of the hopper gate, both of which accompany the aforementioned phenomenon. The end result is elimination of erroneous operation, vibration and noise attributable to these phenomena.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
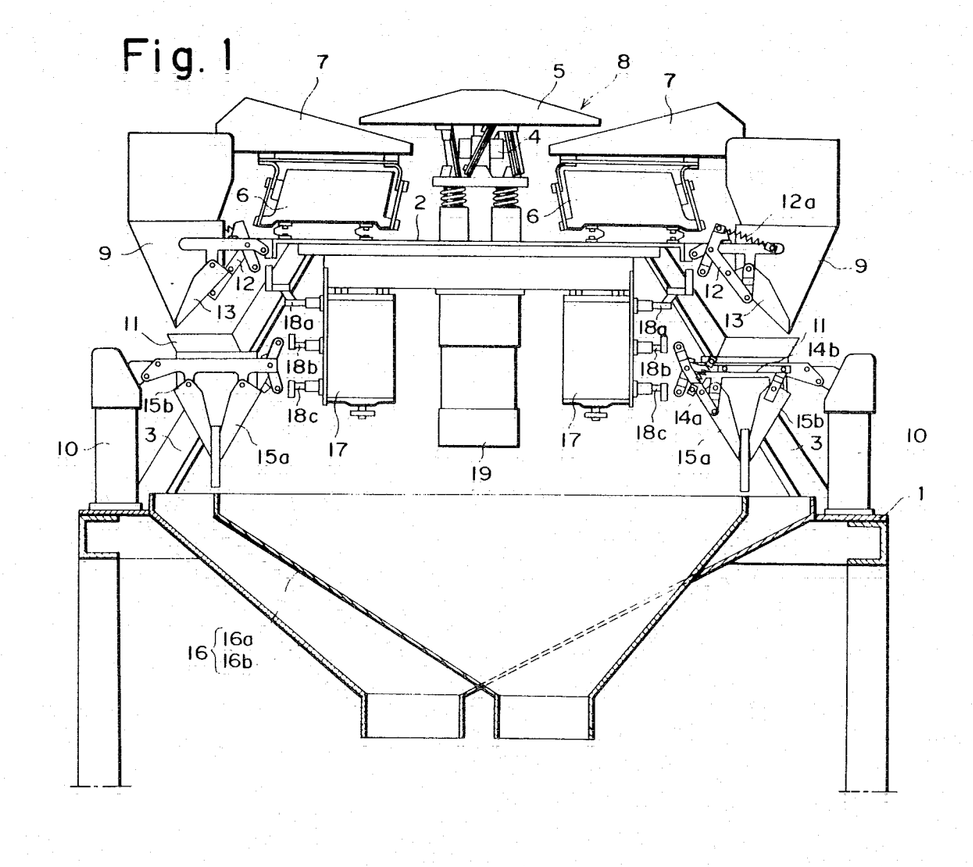
FIG. 1 is a sectional view showing an automatic weighing apparatus according to the present invention.

Referring to FIG. 1, the automatic weighing apparatus includes a base 1 and a supporting platform 2 supported on and positioned above the central portion of the base 1 by a plurality of supporting legs 3. Disposed on the supporting platform 2 is an article supply unit 8 which comprises an article dispersing table 5 supported centrally on the platform 2 by a vibrator 4, and a plurality of supply troughs 7 disposed radially around the dispersing table 5 and supported on the platform 2 by respective vibrators 6. The automatic weighing apparatus further includes pool hoppers 9, equal in number to the supply troughs 7, mounted on the peripheral edge of the platform 2 so as to be situated below the outer ends of the respective troughs 7, weighing machines 10, equal in number to the supply troughs 7 (and, hence, the pool hoppers 9), mounted in a circular array on the base 1, and a plurality of weighing hoppers 11 attached respectively to the weighing machines 10 and located below the corresponding pool hoppers 9, respectively. Each pool hopper 9 is provided with a gate 13 opened by a corresponding link mechanism 12 in response to an externally applied pushing force. Each weighing hopper 11 is equipped with two gates, namely an inwardly opening gate 15a and an outwardly opening gate 15b, where "inwardly" means toward the center of the automatic weighing apparatus main body and "outwardly" means away from the center. These gates 15a, 15b are opened by respective link mechanisms 14a, 14b in response to externally applied pushing forces. Numeral 16 denotes a collecting chute mounted at the central portion of the base 1. The collecting chute 16, which has a wide opening at its upper end for receiving articles discharged from the circularly arrayed plural weighing hoppers 11, comprises an inner chute 16a for receiving the articles discharged from the inner gates 15a of the respective weighing hoppers 15 when these gates are opened, and an outer chute 16b for receiving the articles discharged from the outer gates 15b of the respective weighing hoppers 15 when these gates are opened.

Figure 2:
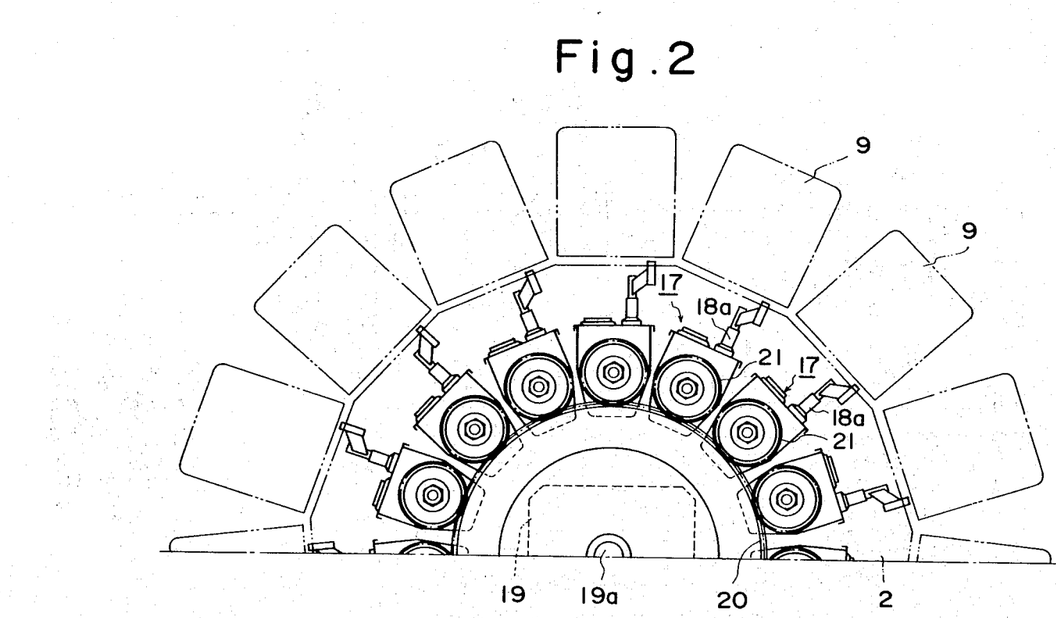
FIG. 2 is an enlarged plan view illustrating a unit for driving devices which open hopper gates.

The weighing apparatus further includes a plurality of devices 17 for opening the gates of the weighing and pool hoppers. Each pool hopper 9 and corresponding underlying weighing hopper 11 constitute a hopper set. Each hopper gate opening device 17 is provided for a corresponding one of the hopper sets for opening the three gates 13, 15a, 15b belonging to each set. The hopper gate opening devices 17 extend radially of the weighing apparatus, depend from the bottom side of the platform 2 and are disposed inwardly of the hopper sets circularly arrayed along the outer edge of the platform 2 the arrangement of the hopper gate opening devices is such that each hopper gate opening devices oppose the corresponding hopper sets from the inner side thereof. Each hopper gate opening device 17 is provided with three push rods 18a, 18b, 18c extending toward the corresponding hopper set for applying a pushing force to the respective link mechanisms 12, 14a and 14b associated with each hopper set. Numeral 19 designates a motor depending from the bottom side of the platform 2 at the central portion thereof. As shown in FIG. 2, the motor 19 includes a rotary shaft 19a having a drive gear 20 of a large diameter affixed thereto. Meshing with the drive gear 20 are input gears 21 which are operatively associated with respective ones of the hopper gate opening devices 17 situated around the gear 20. With such an arrangement, the plural opening devices are actuated by the single drive motor 19.

Figure 3:
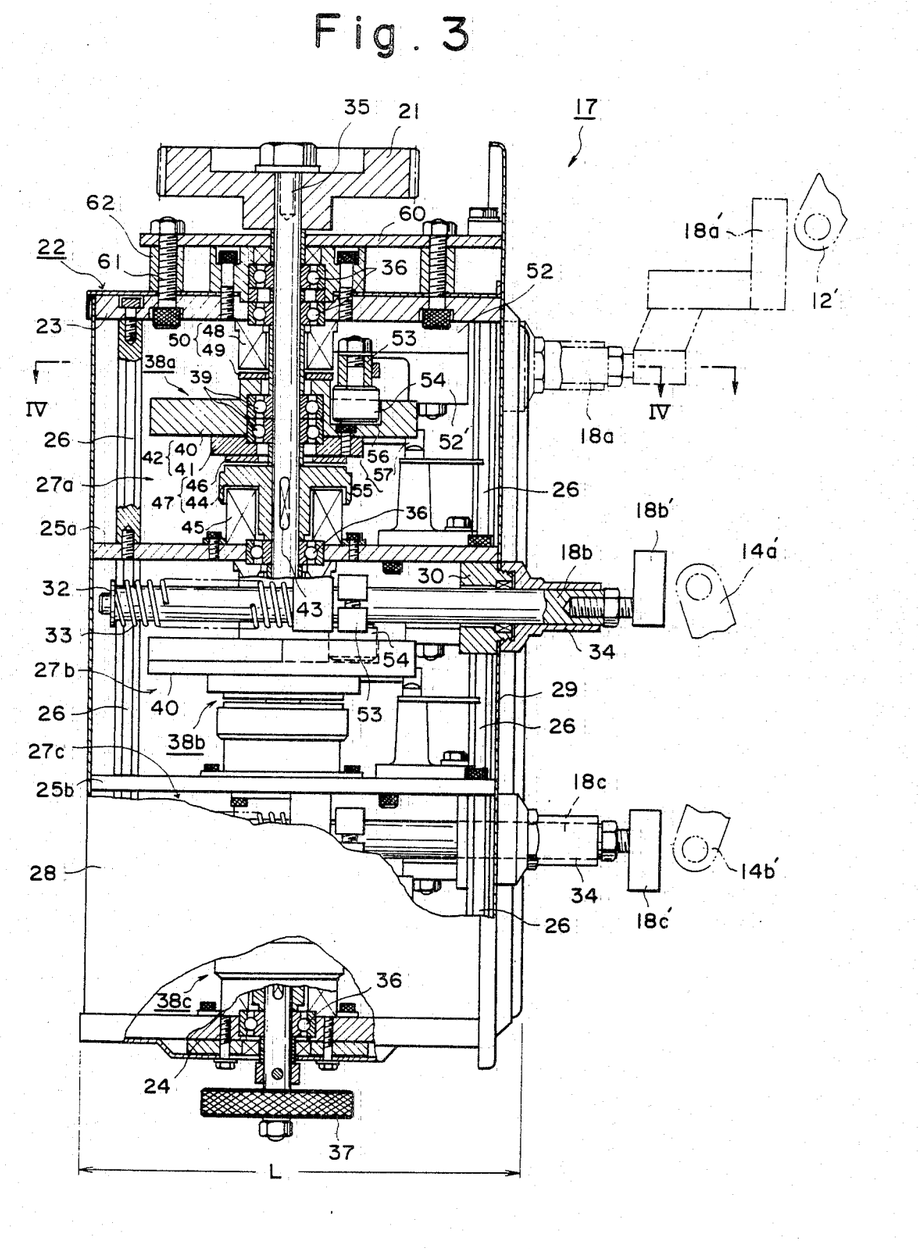
FIG. 3 is an enlarged longitudinal sectional side view of a device for opening hopper gates.
Figure 4:
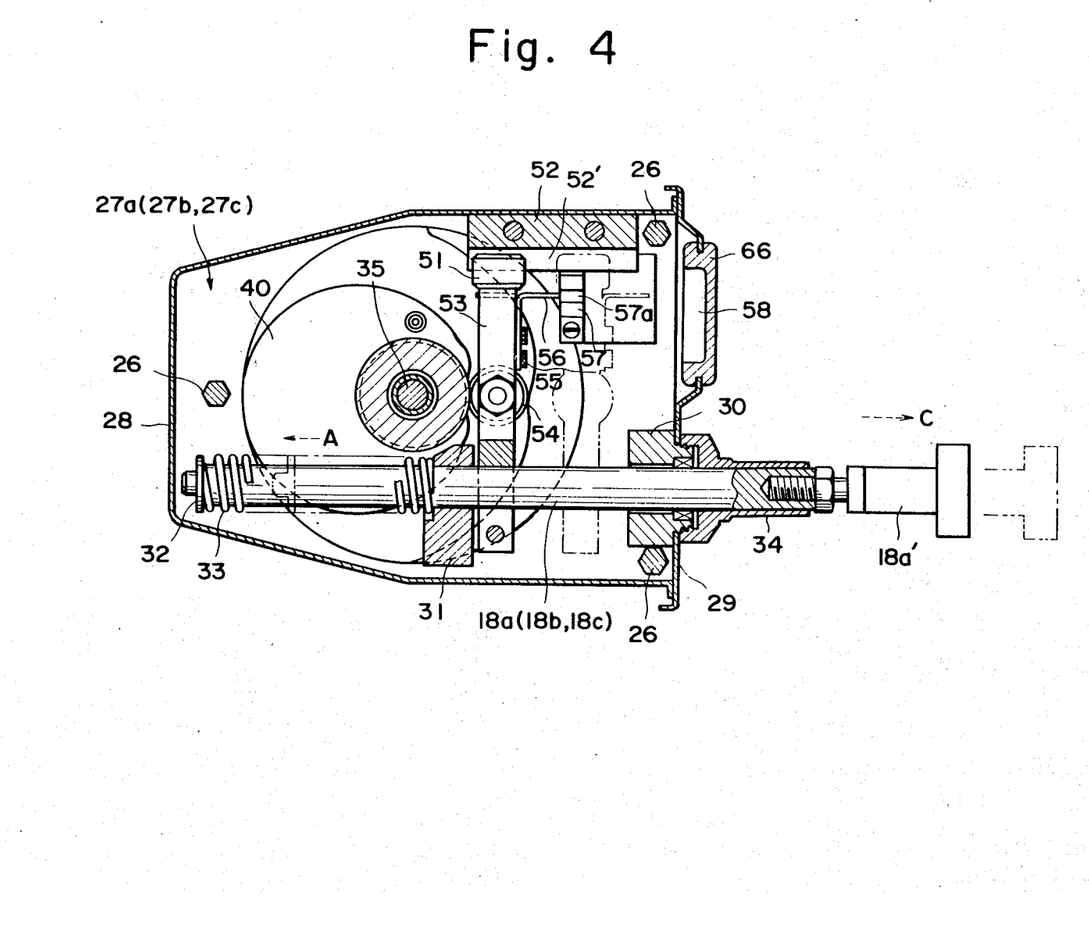
FIG. 4 is a transverse sectional view taken along line IV—IV of FIG. 3.

The hopper gate opening devices 17 are of identical construction, which will now be described with reference to FIGS. 3 through 7. The main body 22 of the hopper gate opening device 17 includes a ceiling plate 23, a floor plate 24, two partitioning plates 25a and 25b, disposed between the plates 23, 24, and a plurality of support columns 26 which interconnect these plates from top to bottom successively to form three drive mechanism compartments 27a, 27b, 27c within the main body 22. The periphery of the main body 22 is enclosed by a side plate 28 having a U-shaped cross-section, and a cover 29 which covers the front side of the main body, namely the side confronting the corresponding set of hoppers 9, 11. The drive mechanism compartments 27a, 27b, 27c are provided with the respective push rods 18a, 18b, 18c, which extend transversely of the device. As shown in FIG. 4, each rod is supported for movement in the direction of the longitudinal axis of the rod by bearing members 30, 31 affixed to the main body 22 for supporting the front end and mid-section of each rod. Each rod is urged backwardly (in the direction A shown in FIG. 4) by a return spring 33 disposed between a spring receiving member 32, which is secured to the back end of the rod, and the bearing member 31 at the mid-section of the rod. In the illustrated embodiment, each bearing member 30, which supports the front portion of each of the push rods 18a, 18b, 18c, has a sleeve 34 screwed thereon from the outside of the front cover 29. The sleeve 34 is arranged so that the distal end of each rod will recede almost entirely within the corresponding casing 34 when the rod is retracted to the maximum degree. As shown in FIG. 3, pushing members 18a', 18b', 18c' are attached to the distal ends of the respective push-rods 18a, 18b, 18c by screws. The pushing members 18a', 18b', 18c' are adapted to press against levers 12', 14a', 14b', indicated by the phantom lines, of the corresponding link mechanisms 12, 14a, 14b for opening the hopper gates.

Numeral 35 denotes a single drive shaft penetrating the drive mechanism compartments 27a, 27b, 27c from top to bottom and having the input gear 21 attached to its upper end. The drive shaft 35 is rotatably supported by the ceiling plate 23a and 25b the two partitioning plates 25 and the floor plate 24 via bearings 36. Attached to the lower end of the shaft 35 which passes through the floor plate 24 is a manually rotatable knob 37 for bringing the input gear 21 and drive gear 20 into proper meshing alignment when the hopper gate opening device 17 is installed.

Figure 5:
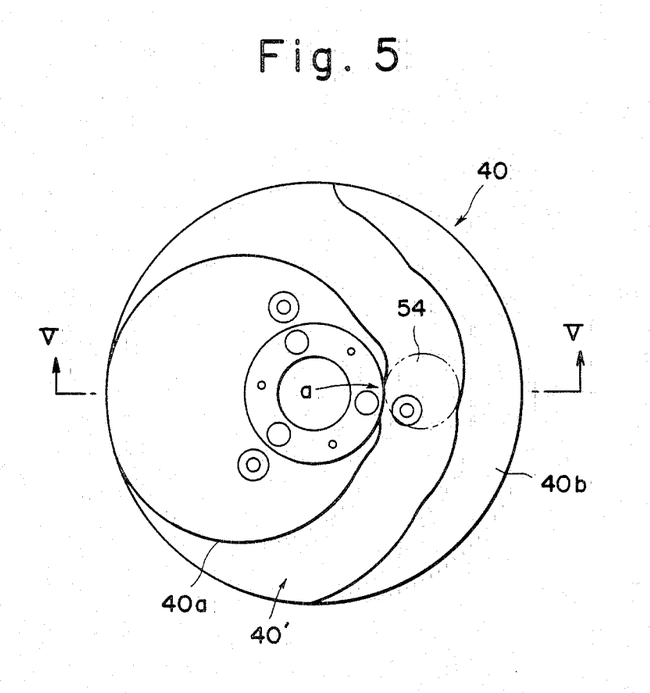
FIG. 5 is an enlarged plan view showing the construction of a cam.
Figure 6:
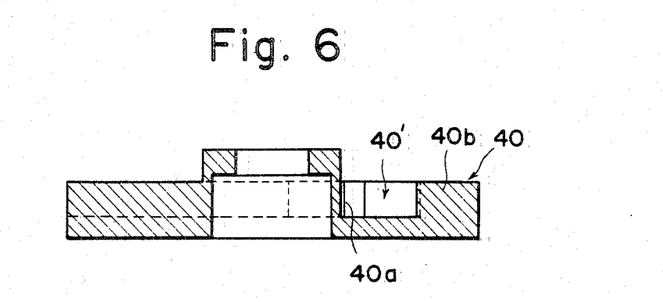
FIG. 6 is a sectional view taken along line VI—VI of FIG. 5.

Accommodated within the drive mechanism compartments 27a, 27b, 27c are drive mechanisms 38a, 38b, 38c. Each drive mechanism includes a cam portion 42, comprising a cam member 40 fit rotatably on the drive shaft 35 through a bearing 39, and a bearing retaining member 41 joined to the cam member 40; a clutch portion 47, comprising a clutch plate 44 secured to the drive shaft 35 below the cam portion 42 by a key 43, an electromagnetic coil 45 secured to the main body 22 below the clutch plate 44, and an attracted member 46 provided on the lower end face of the cam portion 42; and a brake portion 50, comprising an electromagnetic coil 48 secured to the main body 22 above the cam portion 42, and an attracted member 49 provided on the upper end face of the cam portion 42. As shown in FIG. 4, each of the drive mechanisms 38a, 38b, 38c is equipped with a follower member 53 one end portion of which firmly grasps the push rod 18a (18b, 18c), the other end portion of which is equipped with a roller 51 engaging a groove 52' of a guide member 52 secured to the main body 22. The follower member 53 fixes the push rod against rotation and has a follower roller 54 supported at its central portion. The roller 54 is in abutting contact with the peripheral surface of the cam member 40 at all times owing to the return spring 33 affixed to the push rod. As shown in FIGS. 4 and 5, the cam 40 comprises a cam surface 40a and a guide portion 40b. When the cam 40 rotates, the cam surface 40a reciprocates the follower member 53 and, hence, the push rod 18a (18b, 18c) via the follower roller 54 in accordance with a predetermined lift characteristic, namely a characteristic indicating the amount of change in the amount of lift of the follower roller 54 with respect to the angle of rotation of the cam. The guide portion 40b is adopted to guide the follower roller 54 within a prescribed range on either side of a position a, shown in FIG. 5, at which lift is zero. In the illustrated embodiment, the cam surface 40a and guide portion 40b are provided by forming a groove 40' in a disk-shaped member.

Figure 7:
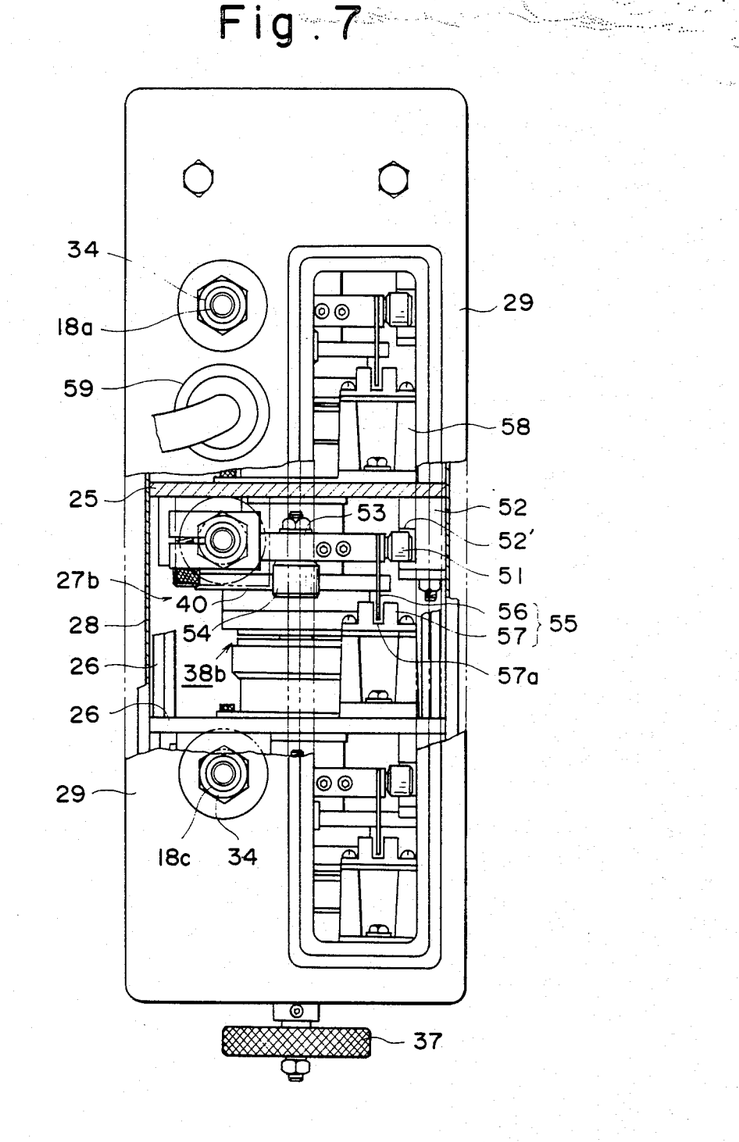
FIG. 7 is a front view of a device for opening hopper gates.

FIG. 7, numeral 55 denotes a rod position sensor comprising a light interrupting plate 56 secured to the follower member 53, and a photocoupler 57 having a slit 57a through which the light interrupting plate 56 passes, the slit 57a being located between light-emitting and light-receiving sections of the photocoupler 57. With the follower member 53 and, hence, the push rod 18a (18b, 18c), retracted to the maximum extent, as shown by the solid lines in FIG. 4, a beam of light from the light-emitting section impinges on the light-receiving section. However, when the follower member 53 and, hence, the shielding plate 56, are moved in direction C, shown in FIG. 4, the plate 56 interrupts the light beam. The front cover 29 is provided with a window 58 to permit adjustment and exchange of the photocoupler 57 in each of the drive mechanisms 38a, 38b, 38c, each window being sealed by a grommet 66. The front cover 29 is also provided with a connector 59 (FIG. 7) to which there is connected an electric cord for supplying the photocoupler with power and for delivering signals from the photocoupler.

Figure 8:
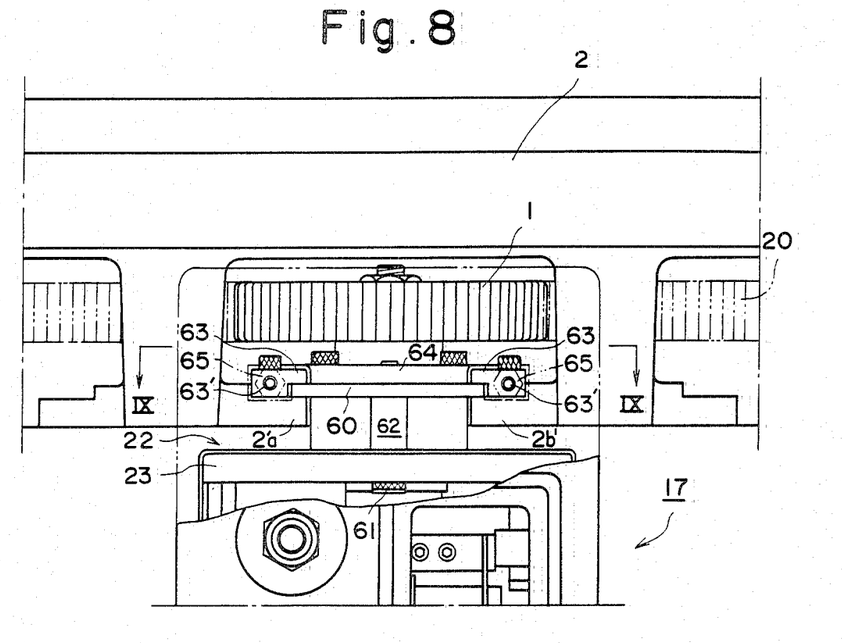
FIG. 8 is a front view illustrating a structure from which the hopper gate opening device is suspended.
Figure 9:
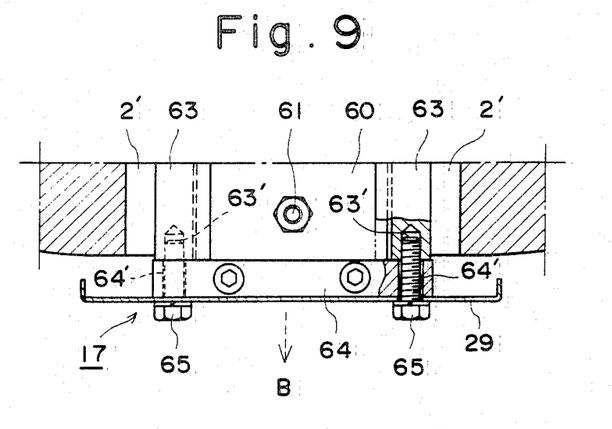
FIG. 9 is a transverse sectional view taken along line IX—IX of FIG. 8.

In FIG. 3, numeral 60 designates a plate connected through spacers 62 to the top side of the ceiling plate 23 of the hopper gate opening device main body 22 by bolts 61 passing through the spacers 62. As shown in FIGS. 8 and 9, the plate 60, referred to as a suspension plate hereinafter, has the opposing side edges thereof fit into guide grooves formed by a pair of projecting pieces 2a' and 2b' projecting from the right and left sides and provided on the bottom side of the platform 2, and a pair of guide members 63 having an L-shaped cross-section and secured to the projecting pieces 2a' and 2b' so as to lie in parallel with each other. Such an arrangement makes it possible to suspend the hopper gate opening device 17 from the bottom side of the platform 2 and to pull the device forward, i.e., in the direction B shown in FIG. 9. When pushing the hopper gate opening device 17 back to its prescribed position, a stopper member 64, which is secured to the front portion of the suspension plate 60, abuts against the front end surface of the guide members 63. In this state, bolts 65 are inserted into bolt insertion holes 64', which are formed in the stopper member 64, and the bolts are screwed into screw holes 63' formed in the end face of the guide members 63, this being carried out from the front side of the front cover 29. Thus, the hopper gate opening device 17 may be fixedly secured to the platform 2.

In operation, articles from the dispersing table 5 of the article supply unit 8 (FIG. 1) are supplied to the weighing hoppers 11 of the weighing machines 10 via the troughs 7 and pool hoppers 9. The articles in the weighing hoppers 11 are then weighed by the corresponding weighing machines 10, combinations of the obtained weight values are computed, the total weight of each combination is found, and an optimum combination is selected, which combination provides a predetermined weight from among the plural total weight values. In a hopper gate opening device 17 corresponding to a weighing machine 10 belonging to the selected combination, the push rod 18b or 18c is thrust forward to open the gate 15a or 15b of the corresponding weighing hopper 11 through the link mechanism 14a or 14b, whereby the articles contained in the weighing hopper are discharged. The inner chute 16a or the outer chute 16b of the collecting chute 16 gathers these articles into a batch having the above-mentioned predetermined weight. In the hopper gate opening device 17 corresponding to the weighing hopper 11 which has discharged its articles, the push rod 18a is thrust forward to open the gate 13 of the corresponding pool hopper 9 through the link mechanism 12, whereby the articles are immediately supplied from the pool hopper 9 to the underlying weighing hopper 11 to prepare for the next weighing cycle.

The hopper gate opening device 17 operates in the following manner to open the gate 13 of the pool hopper 9 and the gate 15a or 15b of the weighing hopper 11. Since the operations are the same for the gates on the pool hoppers 9 and the weighing hoppers 11, the description will be confined solely to the opening of the gate 13 provided on the pool hopper 9. First, as shown in FIG. 3, circuitry is closed for supplying electric power to the electromagnetic coil 45 constituting the clutch 47 of the drive mechanism 38a. This energizes the electromagnetic coil 45 to produce an electromagnetic force in response to which the clutch plate 44 and the attracted member 46, constituting the cam portion 42, are attracted. At such time, since the clutch plate 44 is fixedly secured to the drive shaft 35 driven constantly by the motor 19 acting through the gears 20, 21, the cam portion 42 is rotated through the clutch plate 44. The rotation of the cam member 4 moves follower member 53, whose follower roller 54 is in contact with the peripheral surface of the cam member 40 constituting the cam portion 42, as well as the push rod 18a grasped by the follower member 53, in the direction C against the force of the spring 33, as shown by the phantom lines in FIG. 4. As a result, the push rod 18a is thrust forward to operate the link mechanism 12 (FIG. 1) through the pushing member 18a' attached to the distal end of the push rod, thereby opening the gate 13. Then, when the cam portion 42 makes one full revolution together with the drive shaft 35, the push rod 18a and follower member 54 are restored by the spring 33 to the positions shown by the solid lines in FIG. 4, and the gate 13 of the pool hopoper 9 is closed by virtue of a return spring provided on the link mechanism 12.

In the operation described above, the follower roller 54 is maintained in continuous contact with the cam surface 40a of the cam 40 by the action of spring 33 during the interval of time that the cam 40 rotates 180° from the orientation shown in FIG. 4, that is, during the interval of time that the cam 40 thrusts the push rod 18a forward through the follower roller 54 and follower member 53 while compressing the spring 33. When the lift of the cam 40 diminishes, after the cam has rotated through the angle of 180°, the rate at which the cam lift decreases is greater than the speed at which the spring 33 elongates. Thus, the follower roller 54 tends to separate from the cam surface 40a. This phenomenon tends to occur especially in cases where the cam 40 is being rotated at high speed, and becomes particularly pronounced when the cam lift nears zero, at which point the force applied by the spring 33 is small. As a result, the restoration of the push rod 18a to the left in FIG. 4 and, hence, the closure of the gate 13 of pool hopper 9, is delayed. The cam has a cam curve so designed that the gate 13 will not be violently snapped shut by return spring 12a of the link mechanism 12 in the region where the lift of the cam surface decreases. Thus, the design is such that the gate 13 will close at reduced speed to avoid shock. However, when the foregoing phenomenon occurs, the follower roller 54 can no longer follow the cam curve, making it impossible to achieve the desired effect. At the instant the lift of the cam 40 becomes zero, the follower roller 54 parts from the cam and inertial force vanishes because the biasing force of the spring 33 is small at this time. If the push rod 18a also meets considerable sliding resistance under these conditions while the biasing force of the return spring 12a is ineffective, there is a possibility that the push rod 18a will not be retracted fully but will come to rest before reaching the fully retracted position. If such is the case, the position sensor will not function and subsequent operation will cease. Meanwhile, the gate 13 of the pool hopper 9 will be shut instantantaneously by return spring 12a of the link mechanism 12, making it impossible to achieve a decelerated closure of the gate.

According to the present invention, however, the cam 40 is provided with the guide portion 40b to guide the follower roller 54 over a prescribed range before and after the position a at which the cam lift becomes zero, thereby forcibly restoring the follower member 53 and the push rod 18a. This prevents the follower roller 54 from separating from the cam. Thus, premature cessation of push rod motion is prevented, as well as shock caused by instantantaneous restoration of the gate 13 of pool hopper 9.

When the cam 40 has made one full revolution to bring the push rod 18a to its original (fully retracted) position, the light incident upon the light-receiving portion of the photocoupler 57, constituting the rod position sensor 55, is blocked temporarily by the light interrupting plate 56. This causes the sensor to produce a predetermined electric signal in response to which the circuit (not shown) supplying power to the electromagnetic coil 45 of the clutch 47 is opened, thereby de-energizing the same. At the same time, in response to said signal, a circuit (not shown) for supplying power to the electromagnetic coil 48 of the brake 50 is closed to energize the coil 48, thereby attracting the plate 49 provided on the upper part of the cam portion 42. As a result, the cam portion 42 is brought to a halt at the instant it completes one full revolution. The length of time the electromagnetic coil 48 of the brake 50 is supplied with the energizing current is set by means of a timer to the minimum time required for stopping the revolution of the cam portion 42. When the cam portion 42 stops rotating, the circuit supplying the electromagnetic coil 48 with power is opened to de-energize the coil. This is to prevent heating of the coil and loss of energy caused by supplying the electromagnetic coil 48 with current for longer than is necessary, i.e., while the cam portion 42 is at rest.

In the arrangement described above, the hopper gate opening devices 17 are disposed inwardly of the circularly arrayed corresponding sets of pool hoppers 9 and weighing hoppers 11. Moreover, the cam portion 42, clutch portion 47 and brake portion 50 of each of the three drive mechanisms 38a 38b, 38c are disposed along the single drive shaft 35, thereby reducing the front to back dimension (L in FIG. 3) of the device 17. With the arrangement of the present invention, therefore, the overall size of the automatic weighing apparatus is smaller than that of the conventional apparatus in which hopper gate opening devices are disposed on the outside of the corresponding hopper sets. Moreover, by reducing the dimension L of each hopper gate opening device 17, the devices can be brought closer to the center of the automatic weighing apparatus, thereby contributing even further to a reduction in the size of the apparatus as a whole.

In accordance with the illustrated embodiment, each hopper gate opening device 17 is suspended from the platform 2 so as to be capable of being pulled outwardly from the center the apparatus, thereby facilitating the attaching and detaching operation. In addition, since the portions of the front cover 29 from which the push rods 18a, 18b, 18c protrude are provided with sleeves 34 for receiving the distal ends of the respective rods when the rods are retracted, dust will not accumulate on the rod ends. Since the sleeves 34 also fit over the bearing members 30 of the push rods 18a, 18b, 18c, the portions of the rods that slide through the bearings are not exposed. Further, the windows 58 provided in the front cover 29 allow the photocouplers 57 to be adjusted or replaced merely by removing the grommets 66, without requiring removal of the cover. Moreover, since the cover 29 is provided with the connector 59 for the connection of the electric cord, the cord can be connected and disconnected with facility from outside the automatic weighing apparatus.

In the illustrated embodiment, each weighing hopper 11 is equipped with the two gates 15a, 15b. In an arrangement where the weighing hoppers have only one gate, however, the hopper gate opening device 17 corresponding to each hopper set will have only two push rods and two drive mechanisms, rather than three each.

Thus, as described and illustrated above, the present invention provides an automatic weighing apparatus of the type in which a plurality of weighing machines are disposed on a circle surrounding an article supply unit, with a set of hoppers being provided for each weighing machine. According to the present invention, the devices for opening the gates of the hopper sets are disposed inwardly of the circularly arrayed hoppers, and each device itself is made compact in size. This reduces the overall size of the automatic weighing apparatus and makes it possible to conserve installation space. Since the hoppers are situated on the outside of the opening devices, it is easier to detach the hoppers for, e.g., cleaning, and to reattach the hoppers.

Further, according to the invention, the cam in the drive mechanism of each hopper gate opening device is provided with the guide portion, which is located near the retraction end of the push rod, for forcibly returning the follower roller and, hence, the push rod. The push rod is therefore retracted fully in a reliable manner to close the gate of the corresponding hopper. When the gate is closed in this fashion, operation proceeds smoothly without shock. The end result is less erroneous operation as well as reduced vibration and noise.

As many apparently widely different embodiments of the present invention can be made without departing from the spirit and scope thereof, it is to be understood that the invention is not limited to the specific embodiments thereof except as defined in the appended claims.

What I claim is:

1. An automatic weighing apparatus comprising:
   a supporting platform;
   an article supply unit disposed on said supporting platform, for supplying articles to be weighed;
   a plurality of hoppers disposed adjacent to said article supply unit, for receiving articles from said article supply unit, each said weighing hopper having at least one gate;
   a plurality of weighing machines disposed on said support platform and respectively associated with said hoppers, for weighing articles contained in said hoppers;
   a source drive mechanism disposed at the center of and below said supporting platform; and
   a plurality of hopper gate opening devices disposed on the bottom of said supporting platform inwardly of and respectfully associated with said hoppers, each hopper gate opening device including a drive shaft rotated constantly by said drive mechanism, a push rod for opening the gate of the hopper associated with each hopper gate opening device opposes; and transmission means, for transmitting the rotational motion of said drive shaft to said push rod, said transmission means having a follower roller connected to the push rod, a cam provided with a guide portion, said guide portion engaging said follower roller, a clutch portion for engaging said cam with said rotary shaft, and a brake portion for stopping the rotation of said cam.

2. The automatic weighing apparatus according to claim 1, wherein each of said hopper gate opening devices includes means for removably attaching said hopper gate device to the automatic weighing apparatus so that said hopper gate opening device may be inserted into the automatic weighing apparatus from the outside of the automatic weighing apparatus.

3. The automatic weighing apparatus according to claim 1, wherein each of said hopper gate opening devices further comprises;
   a cover for enclosing said hopper gate opening device, said cover having a portion penetrated by said push rod, and
   a sleeve provided on said portion of said cover penetrated by said push rod for receiving an end of said push rod.

4. The automatic weighing apparatus according to claim 3, wherein said cover has a front portion provided with a window.

5. The automatic weighing apparatus according to claim 3, wherein said cover has a front portion provided with a connector for operative connection to an electric cord.

6. The automatic weighing apparatus according to claim 1, wherein said brake portion has a timer which operates for a predetermined time period, said time period beginning the instant operation of said clutch portion ends.

* * * * *

UNITED STATES PATENT AND TRADEMARK OFFICE
CERTIFICATE OF CORRECTION

PATENT NO. : 4,544,042

DATED : October 1, 1985

INVENTOR(S) : Mikami

It is certified that error appears in the above-identified patent and that said Letters Patent is hereby corrected as shown below:

Col. 1, line 51, "659,762" should be --549,762--.

Col. 3, line 39, "15" should be --11--;
      line 42, "15" should be --11--.

Col. 4, line 19, "of" should be --from--;
      line 46, "23a and 25b" should be --23,--;
      line 47, "25" should be --25a and 25b--.

Col. 6, line 48, "4" should be --40--.

Col. 9, line 23, delete "source";

lines 31-32 delete "opposes".

Signed and Sealed this

Eleventh Day of March 1986

[SEAL]

Attest:

DONALD J. QUIGG

Attesting Officer      Commissioner of Patents and Trademarks